(12) United States Patent
Hartman et al.

(10) Patent No.: US 11,115,921 B2
(45) Date of Patent: Sep. 7, 2021

(54) BATTERY POWERED WIRELESS NODE REPORTING

(71) Applicant: California Eastern Laboratories, Inc., Santa Clara, CA (US)

(72) Inventors: James Paul Hartman, Canton, GA (US); Damon Mark Stewart, Longmont, CO (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 0 days.

(21) Appl. No.: 16/422,154

(22) Filed: May 24, 2019

(65) Prior Publication Data
US 2020/0374795 A1   Nov. 26, 2020

(51) Int. Cl.
  *H04W 52/02* (2009.01)
  *G05B 19/042* (2006.01)
  *H04W 88/16* (2009.01)

(52) U.S. Cl.
  CPC ...... *H04W 52/0203* (2013.01); *G05B 19/042* (2013.01); *G05B 2219/25011* (2013.01); *H04W 88/16* (2013.01)

(58) Field of Classification Search
  CPC . H04W 28/0221; H04W 52/00; H04W 52/02; H04W 52/0203; H04W 52/0225; H04W 52/0235; H04W 52/0277; H04W 52/0287; H04W 52/029; H04W 88/16; H04L 41/0833
  See application file for complete search history.

(56) References Cited

U.S. PATENT DOCUMENTS

| | | | | |
|---|---|---|---|---|
| 2004/0153676 A1* | 8/2004 | Krantz | ............ | H04W 52/0225 713/300 |
| 2006/0187866 A1* | 8/2006 | Werb | ............... | H04W 52/0216 370/311 |
| 2011/0299426 A1* | 12/2011 | Kumar | ............ | H04W 52/0235 370/256 |
| 2012/0115552 A1* | 5/2012 | Bhattacharya | ....... | H04B 1/1607 455/574 |
| 2015/0000651 A1* | 1/2015 | Palacharla | ............ | A62B 9/006 128/202.22 |
| 2015/0237578 A1* | 8/2015 | Gogate | ............... | H04W 52/029 370/311 |
| 2018/0288694 A1* | 10/2018 | Gordon | ................ | H04W 48/20 |

* cited by examiner

*Primary Examiner* — Kan Yuen
(74) *Attorney, Agent, or Firm* — Richard W. James

(57) ABSTRACT

A battery powered wireless apparatus, method, and system. A battery powered wireless node operates to communicating with a gateway on a local area network through the network communication device, cease communication with the gateway after a predetermined period for a predetermined interval of time, and communicate with the gateway continuously when an event occurs.

6 Claims, 4 Drawing Sheets

300

302 — De-energize one or more components of the control node

304 — Keep the components in a de-energized state for a predetermined period of time 306 — Re-energize the components for a predetermined energization period of time 308 — Temporarily maintain the components in an energized state

BATTERY POWERED WIRELESS NODE REPORTING

BACKGROUND

Field of the Disclosure

The present disclosure generally relates to communication of a wireless node to a network controller on a local area network (LAN) or a wide area network (WAN) and, more particularly, to adjusting the frequency at which a battery powered wireless node communicates with a gateway in a building control system.

Brief Description of Related Art

It may be difficult or inordinately expensive to wire building power to certain nodes in an automated control system. Battery power may, therefore, be provided to power nodes that cannot be efficiently powered with building power and, accordingly, battery powered wireless sensing and actuating nodes may be used in computer automated control systems.

Batteries have a limited life during which they can provide power. Batteries, furthermore, can be troublesome to replace and battery replacement may be forgotten. Accordingly, there may be a need for a battery powered node to conserve energy by reducing that node's energy consumption.

Battery powered nodes draw power from the battery to power operating components of the node. Thus, there may be a need for apparatuses, systems and methods that conserve battery power to a battery powered node by disabling the node's wireless communication radio or other components of the node for periods of time. Disabling a node's wireless communication radio may be referred to as going silent.

There may also be a for apparatuses, systems and methods that control the length of time any silent periods for a node may last.

There may also be a need for systems, apparatuses, and methods that cause a battery powered node to enter a fast response mode wherein that battery powered node increases its communication frequency at times when more frequent response is desirable.

There may also be a need for systems, apparatuses, and methods that modify the frequency response time of a battery powered node for limited periods of time.

SUMMARY OF THE INVENTION

In one embodiment, the present disclosure contemplates a battery powered wireless control node. The battery powered wireless control node includes a network communication device for communicating with a remote device and a processor coupled to the network communication device. The processor includes instructions which, when executed by the processor, cause the processor to communicate with a gateway on a local area network through the network communication device, de-energize the network communication device periodically for a predetermined interval of time, and energize the network communication device continuously when commanded to do so.

In another embodiment, the present disclosure contemplates a battery powered wireless control node. The battery powered wireless control node includes a network communication device for communicating with a remote device and a processor coupled to the network communication device. The processor includes instructions which, when executed by the processor, cause the processor to communicate with a second control node on a local area network through the network communication device, de-energize the network communication device after a predetermined period of time elapses for a predetermined interval of time, and energize the network communication device continuously when commanded to do so.

In yet another embodiment, the present disclosure contemplates a method of operating a battery powered wireless control node having a network communication device coupled to a processor. That method comprises the battery powered wireless control node communicating with a gateway on a local area network through the network communication device, the battery powered wireless control node ceasing communication with the gateway after a predetermined period for a predetermined interval of time, and the battery powered wireless control node communicating with the gateway continuously when an event occurs.

BRIEF DESCRIPTION OF THE DRAWINGS

For the present disclosure to be easily understood and readily practiced, the present disclosure will now be described for purposes of illustration and not limitation, in connection with the following figures.

The accompanying drawings, wherein like reference numerals are employed to designate like components, are included to provide a further understanding of the present inventions, are incorporated in and constitute a part of this specification, and show embodiments of those apparatuses and methods that together with the description serve to explain those apparatuses and methods.

Figure 1:
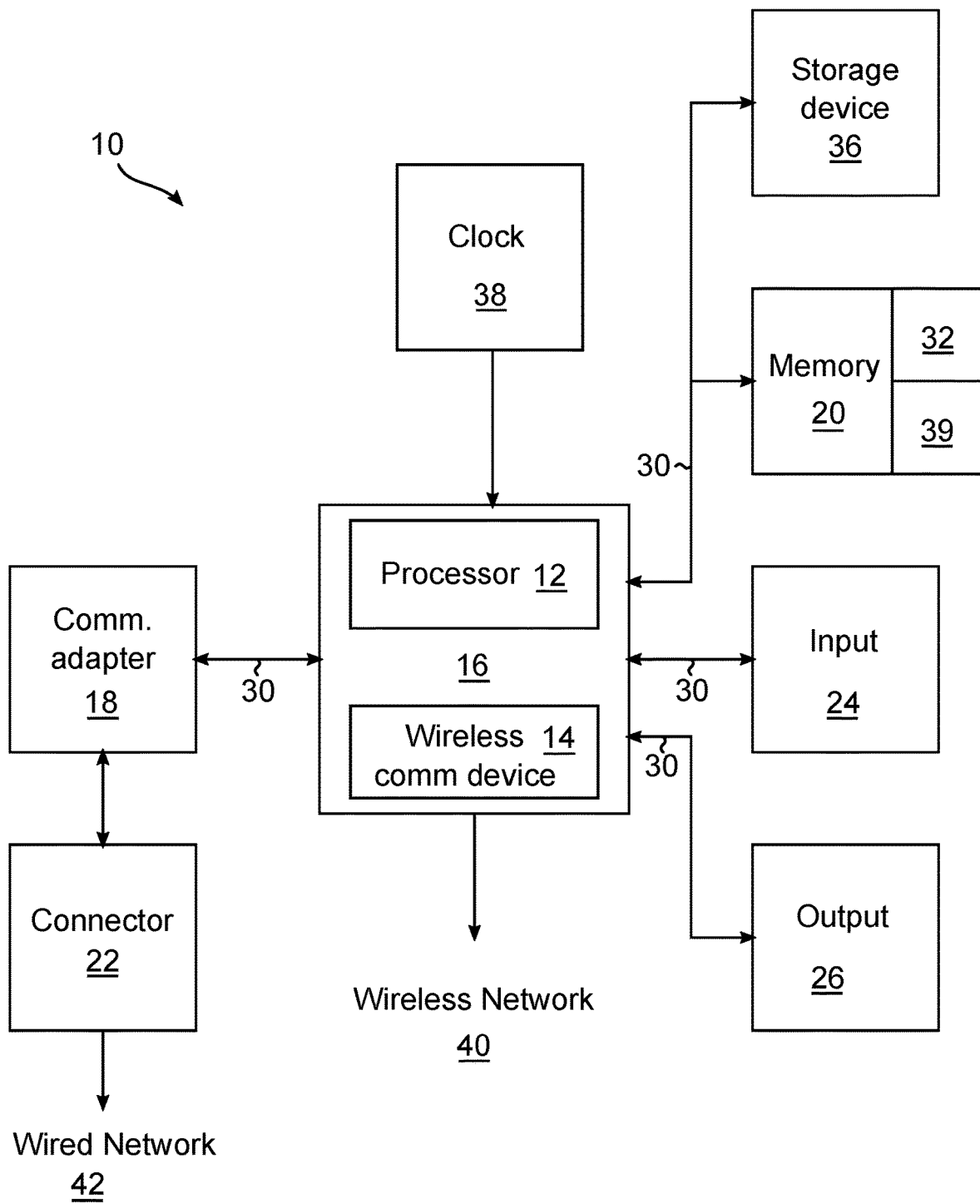
Figure 2:
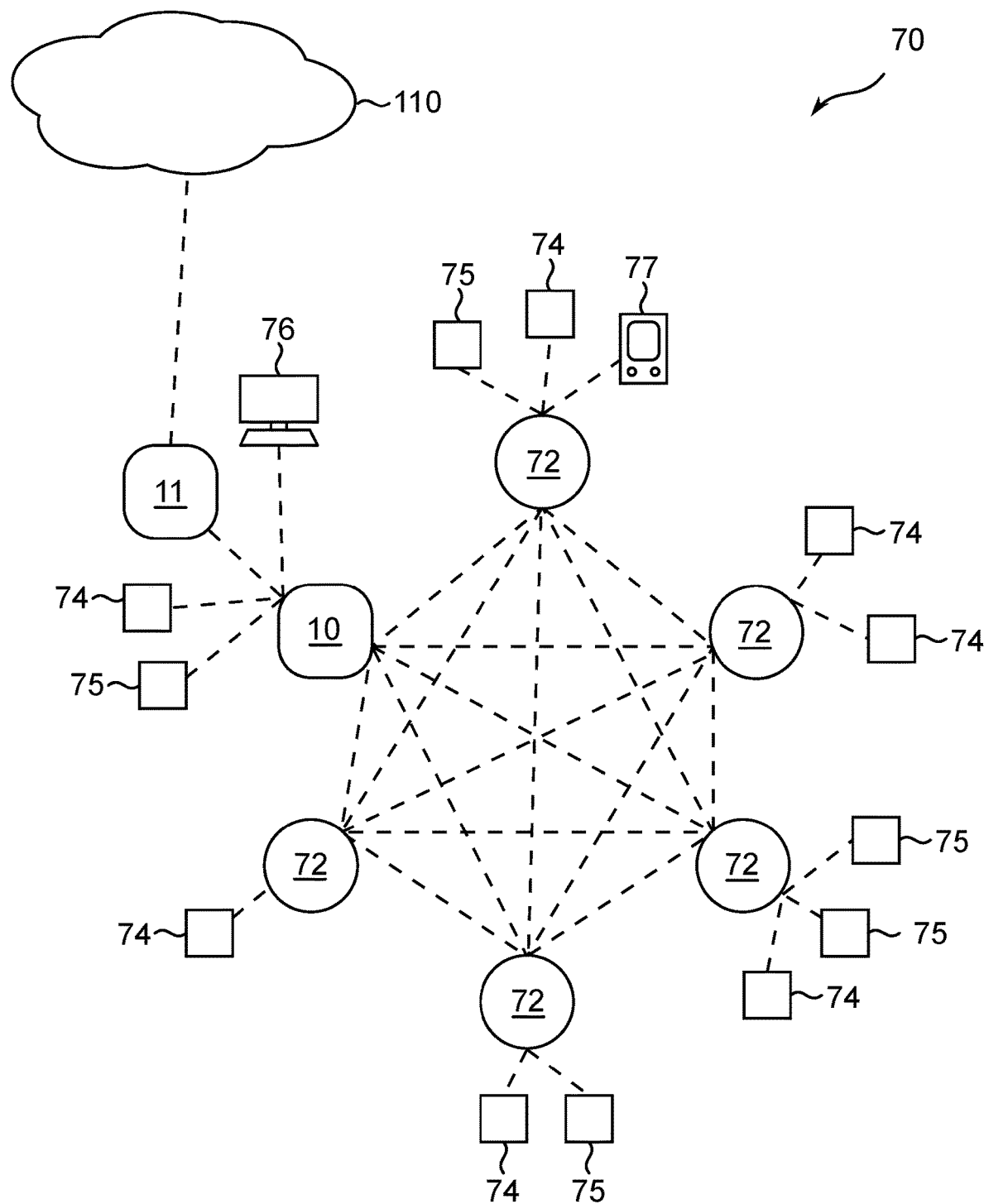
Figure 3:
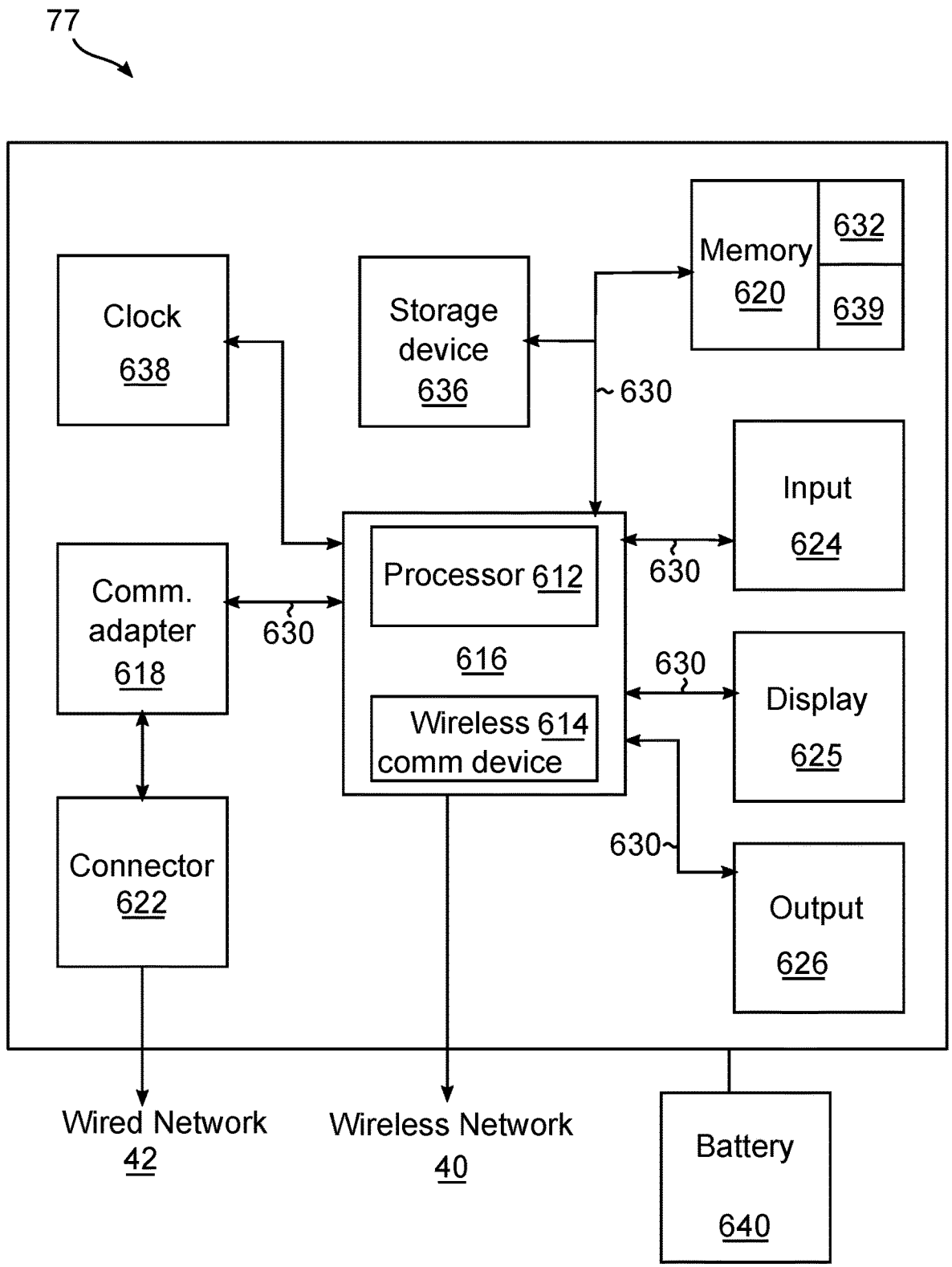
Figure 4:
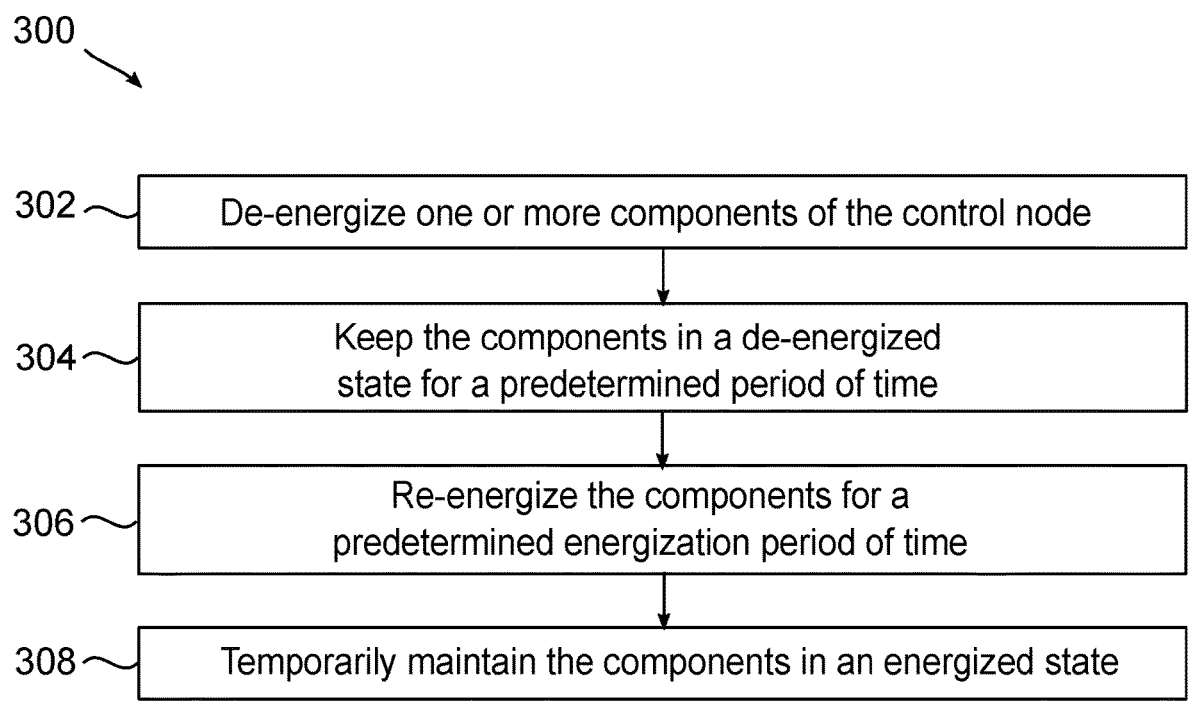

Various other objects, features and advantages of the invention will be readily apparent according to the following description exemplified by the drawings, which are shown by way of example only, wherein:

FIG. 1 illustrates an embodiment of a gateway that operates in connection with control and communication on a local area network;

FIG. 2 illustrates an embodiment of a network in which embodiments of the present invention may operate;

FIG. 3 illustrates an embodiment of a battery powered control node that communicates on a local area network; and FIG. 4 illustrates an embodiment of a method of communication between a battery powered control node and another network node.

DETAILED DESCRIPTION OF THE INVENTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical radios.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

FIG. 1 illustrates an embodiment of a gateway 10 with which a user interface is to communicate in embodiments of battery powered wireless node reporting. The gateway 10 includes a processor 12 and a wireless network communication device 14, which may be a ZigBee® network communication device. The processor 12 and wireless communication device 14 may be combined in a controller 16, which may be a microcontroller. The gateway 10 may also include a communication adaptor 18, memory 20, a communication adaptor port or connector 22, one or more input devices 24, diagnostic output devices 26, and a clock 38.

The gateway 10 may furthermore facilitate communications across networks including one or more wireless networks 40 and one or more wired networks 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be nonvolatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets. Those messages may furthermore be queued in or by the processor 12. The data storage device 36 may not be necessary for operation of the gateway 10 in certain embodiments as data may be stored in memory, for example. Data may also be stored remotely and accessed over a network, such as the Internet.

The communication adaptor 18 permits communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

FIG. 2 illustrates a network 70 in an embodiment of the present invention. The network 70 includes a gateway, such as the gateway 10 illustrated in FIG. 1, one or any desired number of additional gateways 11, one or more routers 72, a plurality of end devices 74 and 75, which may include battery powered control nodes, such as the battery powered control node illustrated in FIG. 3, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter one or more queues, such as a broadcast queue for messages to be transmitted to all devices on the network, a multicast queue for messages to be transmitted to more than one but not all devices on the network, and a unicast queue for messages to be transmitted to one device on the network. Each queue may be a packet queue where packets making up a message are queued for transmission across the network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72, 74, or 75 or events to be actuated at one or more of the end device receiving nodes 72, 74, or 75 such as turning a light on or off, energizing a motor on a motorized window shade or blind, controlling lighting brightness, or controlling lighting color.

FIG. 3 illustrates an embodiment of a battery powered wireless node 77. The battery powered wireless node 77 may be a control node that receives a sensor signal through an input or actuates a device through an output. The battery powered wireless node 77 may include similar components to a gateway 10 and may perform some of the functions of a gateway 10, but its primary function is to perform a sensing or actuating control function or both sensing and actuating control functions.

A variety of sensors may be coupled to the battery powered wireless node 77 to enable the battery powered wireless node 77 to transmit sensed data, such as status, ambient lighting level, and temperature, to the gateway 10, an actuating node 74, or another node on the network 40.

A variety of fixtures and equipment may be actuated by an actuating battery powered wireless node 77, including lighting fixtures for which the battery powered wireless node 77 may, for example, energize and de-energize the fixture, adjust lighting level on a modulating scale, and adjust lighting color on a modulating scale. Equipment actuated by the battery powered wireless node 77 may include a wide variety of equipment including mechanical equipment, electrical equipment, life safety equipment, and security equipment.

In an embodiment, the battery powered wireless node 77 may include a processor 612 and wireless communication device 614. The processor 612 and wireless communication device 614 may be combined in a controller 616 if desired in certain embodiments similar to what is described above regarding corresponding elements 12, 14 (combined in 16), respectively, of the gateway 10 of FIG. 2. The elements may also include data storage, which may be memory 620 such as described above regarding memory 20 of the gateway 10 of FIG. 2. In an embodiment, the memory 620 may be partitioned into sections including an operating system partition 632 where node 77 operating instructions are stored, and a data partition 639 in which data is stored. The stored data may include, for example, one or more recently sensed values, a commanded or sensed status of an actuated device, and control rules.

Data may also or alternatively be stored in a data storage device 636, which may be similar to the data storage device 36 of the gateway 10 of FIG. 2. Data may be stored in one or more of memory 620 and a data storage device 636, or other storage. For example, the storage for the battery powered wireless node 77 may include a combination of flash storage and RAM in an embodiment and may include remote data storage on one or more remote data storage devices, including storage associated with other nodes 10, 11, 74, 75, 76, 77 or the cloud 110. In an embodiment, the storage is or includes a computer readable storage medium including code executable by the processor 612 of the battery powered wireless node 77 to, at least in part, operate the communication method 300 and corresponding system as described below with respect to FIG. 4. The battery powered wireless node 77 may further include user interface equipment, including an input 624 or display 625. As with the gateway 10 and its wireless communication device 14, the battery powered wireless node 77 may communicate across one or more networks through its wireless communication device 614, such as across a wireless network 40 and a wired network 42 possibly via a communication adapter 618 and connector 622. One or both of the wireless network 40 and wired network 42 may be part of a local area network (e.g. 70 shown in FIG. 2) and/or may communicate with one or more other networks such as the remote network 110 of FIG. 2. In an embodiment, the elements, including the processor 612, communication adaptor 618, memory 620, input device 624, output device 626, and data storage device 636 may communicate by way of one or more communication busses 630. Those busses 630 may include, for example, a system bus or a peripheral component interface bus. In an embodiment, the user interface device 77 includes a clock 638 coupled to the processor 612.

FIG. 4 illustrates a method 300 of operation of a battery powered control node 77. In that method at 302, the processor 612 of the battery powered control node 77 de-energizes one or more components of the battery powered control node 77 to reduce power drawn from the battery 640 and thereby to extend the life of the battery 640. At 304, the de-energized components of the battery powered control node 77 remain de-energized for a predetermined de-energization period of time. At 306, the de-energized components of the battery powered control node 77 are re-energized for a predetermined energization period of time. At 308, a special event occurs triggering the processor 612 to continuously energize the components that are periodically de-energized and to maintain those components in an energized state for a predetermined fast response period of time or until a predetermined event occurs. The components may alternately or in addition be energized until a change in a sensed condition is below a desired threshold. For example, if the condition being sensed is ambient light, the components may remain energized until the sensed change in ambient light falls below a desired threshold, such as a change of not more than one lumen in a one-minute period.

In an embodiment, the method 300 of operating a battery powered control node 77 powers its wireless communication device 614 intermittently to communicate with a gateway node 10 or control node 74, 75 in a control network 40. The battery powered control node 77 alternates between energizing its wireless communication device 614 and communicating on the network 40 and de-energizing its wireless communication device 614 during which time the battery powered control node 77 does not communicate with other nodes, including the gateway node 10, on its network 40. The periods of time when the battery powered control node 77 has its wireless communication device de-energized may be referred to as the node 77 "going silent." Silent periods may last for many seconds or minutes and may occur during normal operation of the battery powered node 77.

Fast response mode may occur when, for example, a user interface 76, 77 communication is received at the battery powered wireless control node 77, during set-up of the battery powered wireless control node 77, during initialization of a gateway 10 with which the battery powered wireless control node 77 communicates, during transient periods when there are significant changes in the system that includes the battery powered wireless control node 77, and when a user transmits a command to the battery powered wireless control node 77 to enter fast response mode. Thus, communication with the battery powered wireless control node 77 may be infrequent during normal operation of the battery powered wireless control node 77 and its related network 40 and communication with the battery powered wireless control node 77 may be frequent or continuous when a user is accessing the battery powered wireless control node 77 or its associated network 40 and at times when changes are occurring at battery powered wireless control node 77 or its associated network 40.

At 302, the processor 612 may execute instructions to de-energize any component of the battery powered control node 77 that is not required to operate continuously. For example, the communication adapter 618 may be a significant power consuming component of the battery powered control node 77. Furthermore, it may be sufficient for that communication adapter 618 to operate periodically, rather than continuously. For example, it may be sufficient for the communication adapter 618 of a sensing battery powered control node 77 to operate only after a predetermined period of time has passed, such as every five minutes where, for example, the sensor provides an analog value for a typically slow changing ambient condition, such as ambient light level or temperature. Thus, such a sensing battery powered node 77 may, during normal operation, go silent for predetermined periods at a regular interval without significantly effecting its networked control system 70.

In the normal mode of operation in an embodiment, the sensing battery powered node 77 will alternately energize and de-energize its wireless communication device 614. When the wireless communication device is energized, the sensed value or condition that is sensed by a sensor coupled to the sensing battery powered node 77 may be transferred to another node 10, 11, or 74 on the network 40 or 70 and may particularly be transmitted to the gateway 10 for processing into a command to be transmitted to an actuating node 74 on the network 40 or 70.

It may also be sufficient for the communication adapter 618 of a sensing battery powered control node 77 to transmit its currently sensed value or state periodically through a wireless communication device that is alternately energized and de-energized where an actuating node 74 that uses the sensed value or state in its determination of a desired actuated state or position is not required to react quickly to a change in the sensed at the battery powered control node 77.

In certain embodiments, an actuating node 74 may be a battery powered control node 77. For example, an actuating battery powered control node 77 may not be required to change its actuated state or value quickly and thus that actuating battery powered control node 77 may periodically disable its communication adaptor 618.

At 302, other components of the battery powered control node 77 may be de-energized in addition to or alternatively to the communication adapter 618. For example, if the battery powered control node 77 includes a display 625, another power consuming output 626, a power consuming input 624, or a storage device 636, the processor 612 may de-energize any or all of those components periodically for a predetermined amount of time.

At 304, a period of time that the communication adapter 618 or other component will be de-energized or otherwise disabled may be predetermined. A standard amount of time for disabling communication or other operation of a battery powered control node 77 may be determined for a type of system, for example or, alternatively the period of time to de-energize the communication adapter 618 or other component of a battery powered control node 77 may be set for a particular battery powered control node 77.

At 306, the de-energized component(s) of the battery powered control node 77 will be re-energized periodically to permit its further operation or communication on the network 40. For example, the battery powered control node 77 may be energized for a cycle during which the battery powered control node 77 communicates with the wireless network 40 or the battery powered control node 77 may be energized for a predetermined period of time. Thus, for example, a sensing battery powered control node 77 may be energized long enough for the node 77 to transmit the current sensed condition in terms of a value or binary position. Alternatively, a battery powered control node 77 may have its components energized for a predetermined period of time, such as thirty seconds where, for example, that node 77 has greater functionality than to simply transmit a single sensed condition or may, for example, receive communications from one or more other nodes 10, 11, 74, 75, 76, 77 on the network 70 and/or transmit one or more messages to one or more of those nodes 10, 11, 74, 75, 76, 77 on the network 70.

At 308, an event occurs triggering the processor 612 to energize the components of the battery powered control node 77 that are periodically de-energized and to maintain those components in an energized state for a predetermined period of time or until a predetermined event occurs. That event may be access by or a command from a user interface 76 or 77, when the battery powered control node 77 joins a network 70, or receipt of a command from a gateway 10 or other control node initiating communications with the battery powered control node 77, for example.

In one embodiment, the battery powered control node 77 has one ambient light level sensor coupled thereto and transmits that lighting level to one or more other nodes 10, 11, 74 to control a lighting level of one or more lighting fixtures controlled by one or more actuating nodes 74. In that embodiment, the battery powered control node 77 has no input 624, display 625, output 626, or data storage device 636 coupled thereto. The processor 612, memory 620, and clock 638 are continuously powered by the battery 640 in that embodiment.

The wireless communication device 614 of that embodiment is energized and de-energized periodically. In that embodiment, the wireless communication device 614 is energized and de-energized periodically, alternating between a predetermined period of time when the communication adapter 618 is powered and another predetermined period of time when the communication adapter 618 is unpowered. The period of time when the communication adapter 618 is powered or energized in that embodiment may be a single communication adapter 618 transmit and receive cycle, during which time the communication adapter 618 transmits the current ambient light level sensed by its ambient light level sensor. The period of time that the communication adapter 618 is unpowered in that embodiment may be adjustable between one minute and ten minutes and may be set by a user after consideration of factors including how often light level is desired to be varied and the local cloudiness or other conditions that vary ambient light level.

When the battery powered control node 77 joins a network 40, whether at initial start-up, when a network 40 gateway 10 is replaced, or at any other time, the communication adapter 618 of the battery powered control node 77 may remain powered for a predetermined period of time, which may be, for example, ten minutes to allow the battery powered control node 77 to receive and transmit substantial data associated with joining a network.

When that battery powered control node 77 is operating normally on the network 40 and alternating between energized and de-energized communication adapter 618 states, a user may wish to communicate with the battery powered control node 77. When the battery powered wireless control node 77 receives a communication from a user interface 76 or 77 during a period when the communication adapter 618 is energized, the battery powered control node 77 communication adapter 618 will remain energized continuously until the user interface 76 or 77 ceases to communicate with the battery powered wireless control node 77. In this embodiment, that continuous powering of the communication adapter 618 will continue until there has been no communication with the user interface 76 or 77 for a predetermined user driven period of time. That user driven period of time may furthermore be measured in terms of cycles during which there is no communication between the battery powered control node 77 and the user interface 76 or 77.

Other scheduled or action driven events may also cause the battery powered control node 77 of this embodiment to enter a period during which the battery powered control node 77 continuously powers its communication adapter 618.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalent.

What is claimed is:

1. A battery powered wireless control node, comprising:
a network communication device for communicating with a remote device on a network; and
a processor coupled to the network communication device, the processor including instructions which, when executed by the processor, cause the processor to:
place the battery powered wireless control node in a fast response mode in which the network communication device is energized continuously when the battery powered node is joining the network;
take the battery powered wireless control node out of the fast response mode after the battery powered wireless control node has successfully joined the network such that communication with the battery powered wireless control node is performed periodically after passage of a predetermined time period and the network communication device is de-energized between communication periods;
place the battery powered wireless control node in the fast response mode in which the network communication device is energized continuously when a user interface communicates with the battery powered wireless control node over the network; and
terminate the fast response mode for the battery powered wireless control node for a first predetermined time, when a second predetermined time has elapsed after the user interface ceases communicating with the battery powered wireless control node, such that communication with the battery powered wireless control node is performed periodically and the network communication device is de-energized between communication periods.

2. The battery powered wireless control node of claim 1, wherein the fast response mode is terminated a predetermined number of communication cycles after the user interface ceases to communicate with the battery powered wireless control node.

3. The battery powered wireless control node of claim 1, wherein the battery powered wireless control node is coupled to a sensor of a building control system and wherein the battery powered wireless control node transmits a value associated with a condition sensed by the sensor to a gateway for use in controlling an actuator coupled to the building control system.

4. The battery powered wireless control node of claim 1, wherein the battery powered wireless control node is coupled to an actuator of a building control system and wherein the battery powered wireless control node operates the actuator based on information transmitted from another wireless control node communicating on the network.

5. A method of operating a battery powered wireless control node having a network communication device coupled to a processor, the method comprising:
energizing the network communication device of the battery powered wireless control node continuously in a fast response mode when the battery powered wireless control node is joining a network;
terminating the fast response mode for the battery powered wireless control node after the battery powered wireless control node has successfully joined the network such that, after the battery powered wireless control node has successfully joined the network and the fast response mode has ceased, communication with the battery powered wireless control node is performed periodically and the battery powered wireless control node network communication device is de-energized between periodic communications;
energizing the network communication device continuously in the fast response mode when a user interface communicates with the battery powered wireless control node; and
terminating the fast response mode for the battery powered wireless control node for a first predetermined time, when a second predetermined time has elapsed after the user interface ceases communicating with the battery powered wireless control node such that communication with the battery powered wireless control node is performed periodically after terminating fast response mode and the battery powered wireless control node network communication device is de-energized between periodic communications.

6. The method of operating a battery powered wireless control node having a network communication device coupled to a processor of claim 5, further comprising the battery powered wireless control node again ceasing communication when a condition sensed at the battery powered wireless control node changes by less than a predetermined amount in a predetermined period of time.

* * * * *